United States Patent
Schilling et al.

(10) Patent No.: US 8,396,093 B2
(45) Date of Patent: Mar. 12, 2013

(54) DEVICE AND METHOD FOR LOW INTERFERENCE SIGNAL TRANSMISSION

(75) Inventors: Harry Schilling, Eichstätt (DE); Georg Lohr, Eichenau (DE)

(73) Assignee: Schleifring und Apparatebau GmbH, Furstenfeldbruck (DE)

( * ) Notice: Subject to any disclaimer, the term of this patent is extended or adjusted under 35 U.S.C. 154(b) by 2329 days.

(21) Appl. No.: 10/787,432

(22) Filed: Feb. 26, 2004

(65) Prior Publication Data

US 2004/0165652 A1  Aug. 26, 2004

Related U.S. Application Data

(63) Continuation of application No. PCT/DE02/03024, filed on Aug. 19, 2002.

(30) Foreign Application Priority Data

Aug. 30, 2001 (DE) .................................. 101 42 102

(51) Int. Cl.
*H04B 1/00* (2006.01)

(52) U.S. Cl. ....................................................... 375/130

(58) Field of Classification Search .................. 375/130, 375/140, 141, 142, 146, 147, 150
See application file for complete search history.

(56) References Cited

U.S. PATENT DOCUMENTS

| | | | | |
|---|---|---|---|---|
| 4,152,649 A | * | 5/1979 | Choquet | 375/231 |
| 4,835,517 A | * | 5/1989 | van der Gracht et al. | 375/222 |
| 5,007,088 A | * | 4/1991 | Ooi et al. | 380/46 |
| 5,121,385 A | * | 6/1992 | Tominaga et al. | 370/435 |
| 5,365,585 A | * | 11/1994 | Puhl et al. | 380/265 |
| 5,592,555 A | * | 1/1997 | Stewart | 380/247 |
| 5,612,955 A | * | 3/1997 | Fernandes et al. | 370/433 |
| 5,740,531 A | | 4/1998 | Okada | |
| 5,793,318 A | * | 8/1998 | Jewett | 341/118 |
| 5,907,576 A | * | 5/1999 | Endo | 375/130 |
| 6,014,446 A | * | 1/2000 | Finkelstein | 380/46 |
| 6,044,068 A | | 3/2000 | El Malki | |
| 6,055,497 A | | 4/2000 | Hallkvist et al. | |

(Continued)

FOREIGN PATENT DOCUMENTS

| | | |
|---|---|---|
| DE | 2516029 | 10/1976 |
| DE | 3403650 | 8/1985 |

(Continued)

OTHER PUBLICATIONS

German Patent Application No. 19758256.7 entitled "Device for Low-Interference Signal Transmission," filed Dec. 31, 1997.

(Continued)

*Primary Examiner* — Jean B Corrielus
(74) *Attorney, Agent, or Firm* — Kevin L. Daffer; Daffer McDaniel, LLP

(57) ABSTRACT

The invention relates to a device and a method for transmitting digital signals between at least two units disposed to move relative to each other. By combining information signals with random signals, the spectral power density of a signal is reduced for the same transmission power. The device can include a data transmitter, pseudo random generator or random generator, and a combining unit for combining the output from the transmitter with the output from the generator. The combined result is sent across a transmission path where it is received by a data receiver. The receiver has a combining unit for receiving the combined result compared to a second pseudo random or random generator output for recreating the original transmitter output.

9 Claims, 3 Drawing Sheets

U.S. PATENT DOCUMENTS

| | | | |
|---|---|---|---|
| 6,188,714 B1* | 2/2001 | Yamaguchi | 375/130 |
| 6,345,073 B1* | 2/2002 | Curry et al. | 375/265 |
| 6,393,000 B1* | 5/2002 | Feldman | 370/316 |
| 6,747,969 B1* | 6/2004 | Hirsch | 370/342 |
| 6,985,521 B1* | 1/2006 | Rezvani et al. | 375/222 |
| 7,072,289 B1* | 7/2006 | Yang et al. | 370/208 |
| 2002/0053062 A1* | 5/2002 | Szymanski | 714/801 |

FOREIGN PATENT DOCUMENTS

| | | |
|---|---|---|
| DE | 4340330 | 6/1995 |
| DE | 19860909 | 12/2007 |
| EP | 0944178 | 9/1999 |

OTHER PUBLICATIONS

International Search Report, PCT/DE02/03024, mailed May 26, 2003.

"Taxi™—compatible HOTLink® Transceiver," Cypress Semiconductor Datasheet CY7C9689A, Sep. 29, 2006, pp. 1-51.

* cited by examiner

DEVICE AND METHOD FOR LOW INTERFERENCE SIGNAL TRANSMISSION

This application is a continuation of pending International Patent Application No. PCT/DE02/03024 filed on Aug. 19, 2002, which designated the United States and claims the priority of pending German Patent Application No. 101 42 102.8 filed on Aug. 30, 2001.

FIELD OF THE INVENTION

The invention relates to a device and a method for transmitting digital data between units moving relative to each other.

The fields of application of digital data paths are continuously expanding. In most cases of application, digital signal transmissions offer a substantial improvement over analog transmission paths. The costs of high-speed data-channels become lower as new transmission technologies are being developed. In the meantime, transmission channel bandwidths have become very inexpensive. Multiplexing of a plurality of transmission paths in one single high-speed channel is usually the most economical solution. This is the case particularly with high-speed transmission devices which transmit data over a short distance between two units which are movable, and particularly rotatable, relative to each other.

DESCRIPTION OF THE PRIOR ART

An especially important aspect of the application of high-speed data-paths, but also of any other instrument, is that of electromagnetic compatibility (EMC). Electromagnetic emissions are particularly critical with cable-bound transmission paths and devices for transmitting signals between units movable relative to each other. However, transmitters/receivers and repeaters of glass-fiber based transmission paths also can radiate electromagnetic fields.

Various methods are known for minimizing interference emission. These involve the fields of screening, modulation of data clock, and coding. Measures of screening usually involve high material outlay and mechanical outlay. These measures are therefore the most expensive. Measures for modulation of data clock may cause a widening of a transmitted signal spectrum in a narrow band region, and therewith a reduction of the signal amplitudes of single spectral lines. An efficient signal encoding has effects, particularly in a broad band, which are therefore particularly efficient.

If the data are transmitted without any encoding, then bit combinations may arise which produce single discrete spectral lines of very high power. Here the most unfavorable case is that of a bit sequence 1 0 1 0. This produces the known square wave spectrum with the ground wave of the transmitted frequency, which corresponds to one half of the bit rate and its odd number multiples. Here the ground wave has the largest amplitude. In order to provide substantial improvement concerning interference emissions, the data are frequently encoded for serial data transmission by standard sets of chips. Current types of encoding are, for example, the 4B/5B or 8B/10B coding. These are described, for example, in the CYPRESS data sheet Cy7C9689A, issued by Cypress Semiconductor Corporation, San Jose, USA, Jun. 11, 2001. Furthermore, the subject matter disclosed in DE 197 58 256.7 also form part of the present patent application.

With a 4B/5B coding, for example, a 4 bit word is re-encoded to a 5 bit word. This leads to additional redundancy and also to the possibility of forming, by encoding, better bit patterns having changing bit sequences. Here an even better case is that of an 8B/10B coding. A coding of this kind provides a significant improvement; with this results of 6 dB were measured in trials.

The encoding methods described here are usually firmly integrated in standard transmitters or receivers. When it is desired to further improve EMC properties by means of better encoding, then this is hardly possible. Furthermore, a number of transmitters or receivers which are on the market perform no encoding of data and therefore have only very poor EMC properties.

A certain extent of improvement of the EMC properties, achieved by widening the spectrum by means of scramblers, is disclosed in DE 43 40 330 A1. Here, however, continuous scrambling is proposed, which is practicable only with additional high outlay, especially in combination with known components for signal transmission, because for this, in particular, special synchronization circuits, as described in DE 34 03 650 C2, must be provided.

Furthermore, in U.S. Pat. No. 5,740,531 a device is described which transmits pseudo random patterns in the transmission intervals, in order to determine the quality of the transmission channel.

SUMMARY OF THE INVENTION

It is the object of the invention to design a device and a method for transmitting digital signals from a first unit to a second unit which may be movable relative to each other, whereby any signals on digital transmission paths are modified by being encoded so that their EMC properties are substantially improved.

In the device of the invention the first unit comprises:
a data transmitter for emitting the digital signals;
a pseudo random-generator or a random generator for generating pseudo random values or random values, respectively, and
a combining unit for combining the signals emitted by the data transmitter with the pseudo random values or the random values; and the second unit comprises:
a data receiver connected to the data transmitter by a transmission path, for receiving the digital signals.

In accordance with the invention a control unit is provided for controlling the combining unit so that pseudo random data or random data are transmitted during intervals between periods for transmitting information data (wanted data).

The method of the invention for transmitting digital signals between a plurality of units of which at least one first unit comprises a data transmitter and at least one second unit comprises a data receiver, and at least one of the first units is connected by at least one transmission path to one of the second units, includes the step of inserting true or pseudo random data between information data, so that in a spectrum of a signal to be transmitted, gaps between spectral lines are substantially reduced, so that amplitudes of the spectral lines fall off, however without an entire bandwidth needed for transmission being substantially increased.

Therefore, according to the invention a pseudo random generator is provided in one of the units emitting the signals, the pseudo random values of which are combined in a combining unit with the signals to be emitted. By incorporating pseudo random values, the signal spectrum of which resembles that of a white noise in the ideal case, the gaps between the spectral lines of an information signal can be filled, and simultaneously the spectral power density reduced. This considerably improves the EMC properties. Here a further improvement over the above-cited encoding methods is also possible, because longer random sequences, even extending over a plurality of data packages, can be achieved. For example, a combination with the random data can be performed word by word before a serialization of the data stream, or even later in a serial data stream.

An especially critical operating condition in many transmission devices, particularly in computer tomographs, is the rest condition. Here, with computer tomographs, no transmission of an image and therefore of data is made during the times when the X-ray tube is switched off. As a rule, this is 90 to 95% of the operating time. According to prior art, synchronization patterns are regularly transmitted here. These patterns have a constant value, i.e. the same bit sequence is always successively emitted for a long time. This is extremely unfavorable from the point of view of interference suppression. Here a remedy is provided by an emission of random numbers which can be generated with a simple random generator. Because, in any case, the synchronization pattern contains invalid values and serves exclusively for a synchronization of the high speed data path, the transmitted information is of no importance. Thus, simple re-designing of the transmitter to generate a pseudo random sequence instead of the image data in the case of the rest condition, can lead to a substantial improvement of the EMC properties. In the embodiments of the invention in which a pseudo random generator is exclusively employed in one of the transmitter units, but not in one of the receiver units, a random generator which also generates true random values can be employed. In the simplest case such a random generator can consist of, for example, a noise generator which feeds a comparator. When, for example, the noise signal exceeds a given limiting value at the instant of scanning, then the signal will become logically one, and in the other case, logically zero. True noise generators can always be employed when a correlation of the transmitted and the received signal with a noise signal is not necessary for recovering the information.

A particularly good spectral distribution can be obtained by means of especially long code sequences. As a rule, these cannot be achieved by an emission of single short data packages. Therefore, an arrangement is proposed which converts the data stream with a conventional coding, such as for example 4B/5B, into a noise-like signal having a very long repeat time. According to the invention, the conversion is performed with a pseudo random generator which generates a deterministic pseudo random sequence, and a combination of this bit sequence with the data stream. Such a combination may be, for example, the exclusive OR- (EXOR-) combination. The output signal now has the sequence length of the pseudo random-number sequence, and with a high random-number sequence can lead to a substantial reduction of the noise. In the receiver, a second identical pseudo random generator is employed which generates the identical sequence and combines this in turn with the transmitted signal of the data path, so that the original signal can be reconstructed. Here too, an exclusive OR-combination is particularly simple to achieve. The bit timing of the pseudo random-number signal must be synchronous with the bit timing of the data path. It is preferably of the same magnitude, but may also represent a multiple or a fraction of the corresponding bit rate. Thus, it would be conceivable, for example, that the bit timing generator is clocked with the word timing of the transmission means, so that it generates a new initial value only with each data word which, for example in the case of a 4B/5B coding, consists of five single bits. With this embodiment of the invention, it is unconditionally necessary to employ random generators which generate a known and therefore predictable number sequence. Only in this way is a reconstruction of the sent signals with a second random generator having the same function possible. Such generators are designated as being pseudo random generators, because they generate random values which are not true, because predictable. Nevertheless, with such pseudo random generators it is possible to generate statistically good equi-probable values, and therewith also broadband signals within the signal frequency range.

Of special importance is the synchronization of the two random generators on the transmitter and the receiver side. In a particularly simple case, the synchronization may be made via a low frequency auxiliary signal. This signal can be transmitted via additional transmission routes, such as, for example, mechanical sliding contacts. In order that the demands made on flank steepness or time shift of this signal do not become too heavy, it is expedient to begin a new sequence at the beginning of a data word.

A further possibility of synchronizing both generators consists of transmitting a rest signal along the data path for a certain time. This is modulated by the pseudo random generator on the transmission side. Now the pseudo random generator on the secondary side begins to initialize the sequence at different starting times for so long until it can recognize the rest condition signal. From this point of time onwards, both pseudo random generators run synchronously. In order to enable especially fast synchronizing, in this method the pseudo random generator on the transmitter side can first begin with a relatively short sequence which, for example, corresponds to the length of a data package. After a given time it switches to its longer standard sequence length. The pseudo random generator on the receiver side can detect this by a change of the bit pattern, and also use this for switching over to the correspondingly longer pseudo random-number sequence.

In accordance with the invention, a method is set out in which a first data stream, generated by the transmitter, is combined with a second random data stream. This, of course, does not refer only to one continuous data stream, but also to a sequence of data packages. In this, the random data stream may be a stream of true random data, or also of only pseudo random data. Preferably the exclusive OR-function is chosen as a combining function. Of course, other combining functions are also conceivable. By means of this combination with a random data stream, the gaps in the spectrum between the single spectral lines of the data signal are filled, which leads to lower spectral power density at the same transmitted power. A suitable combination for reconstructing the original signals is necessary in the receiver.

In a further method, a random sequence (pseudo random sequence) is inserted in the intervals between the signals. This, particularly with transmission paths for which relatively long transmission intervals exist, results in a low spectral power density. Here, owing to the continuous transmission of signals, the synchronization between transmitter and receiver can be maintained even in the intervals.

BRIEF DESCRIPTION OF THE DRAWINGS

In the following the invention will be described by way of exemplification, without limitation of the general inventive concept, with the aid of examples of embodiment, for which reference is made to the drawings. Shown by FIG. 1: is a device according to the invention.

DETAILED DESCRIPTION OF THE INVENTION

Figure 1:
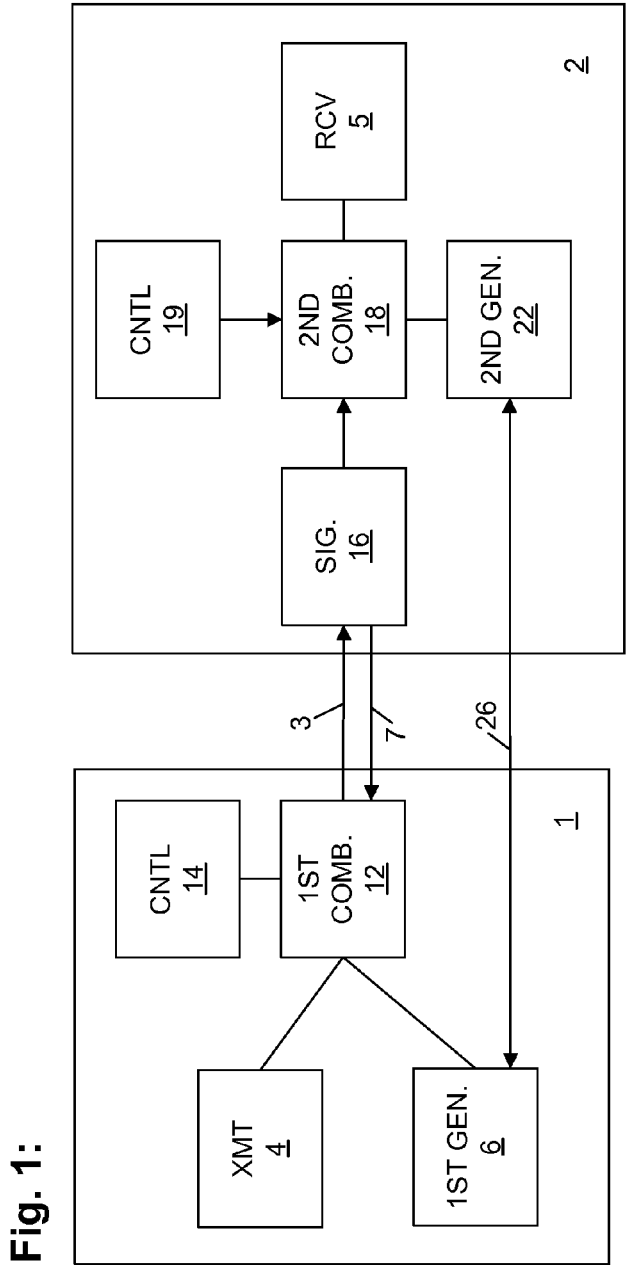

FIG. 1 shows schematically an example of a device according to the invention, having one transmitting and one receiving unit. The entire device consists of a first unit 1 communicating with a second unit 2. A connection is made by means of a transmission path 3. For communication, the first unit 1 comprises a data transmitter 4 and the second unit 2 a data receiver 5. Furthermore, the first unit 1 contains a pseudo random-number generator or random generator 6, the signals of which are combined with the signals of the data transmitter.

In the case that both units exchange information data only at certain times, and the times between information-data packages are filled with random data, further components are necessary. In order that the random data are not misinterpreted here by the data receiver 5 as being information data, certain precautions must be taken. Thus, for example, the number of pseudo random data of the data packages to be transmitted may be fixed, or transmitted from the data transmitter to the data receiver in a specific data package. Furthermore, an information exchange between the data transmitter and the data receiver may take place through an optional signaling line 7. Thus, for example, the data transmitter may signalize, by means of a specific logic level on this line, the presence of information data or pseudo random data to the data receiver. If, on the other hand, the communication is controlled by the data receiver, then it can request information data from the data transmitter by means of a signaling line 7. Here too, pseudo random data are transmitted in the case of no information data being sent.

FIG. 1 thereby illustrates a first combining unit 12 for combining the signals emanated by the data transmitter 4 with the pseudo random values or the random values from generator 6. The second unit 2 includes receiver 5 for receiving the digital signals output from combining unit 12 and, more specifically, from a second combining unit 18 within the second unit. Control unit 14 is coupled to and controls first combining unit 12 in such a manner that pseudo random bit values or random values are transmitted at times other than the first time intervals at which the first digital signals are transmitted. The second unit 2 includes a signaling unit 16 for requesting first digital signals from the data transmitter, and the data transmitter is adapted to send first digital signals, pseudo random values, and/or random values across signaling line 3 in response to output from the signaling unit 16. Signaling unit 16 can request the first digital signals from the data transmitter via a request from signaling unit 16 over line 7. A second combining unit 18 is provided in the second unit 2 for combining received signals with pseudo random values from second generator 22. A control unit 19 associated with data receiver 5 is adapted to perform at various times a synchronization of the pseudo random generator or random generator of second unit 2 with the received digital data from the first unit until a known transmission pattern occurs as a result of the combination. An additional transmission path 26 is provided for synchronizing the pseudo random generator or random generator 16 of the first unit 1 and the pseudo random generator or random generator 22 of the second unit 2.

Figure 2:
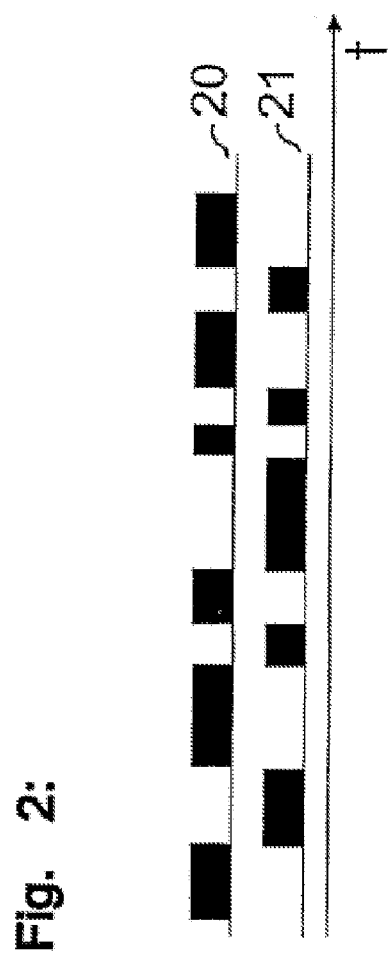
FIG. 2: is a time-dependency diagram of a device in which random data are transmitted during intervals.

FIG. 2 shows an example of the emission of information data or pseudo random data, plotted along a time axis (t) in a time-dependency diagram. The curve 20 shows the sending of information data during the heavily shaded periods. In the intermediate intervals, pseudo random numbers are generated by the pseudo random-number generator and sent out by the data transmitter, as shown by the curve 21.

Figure 3:
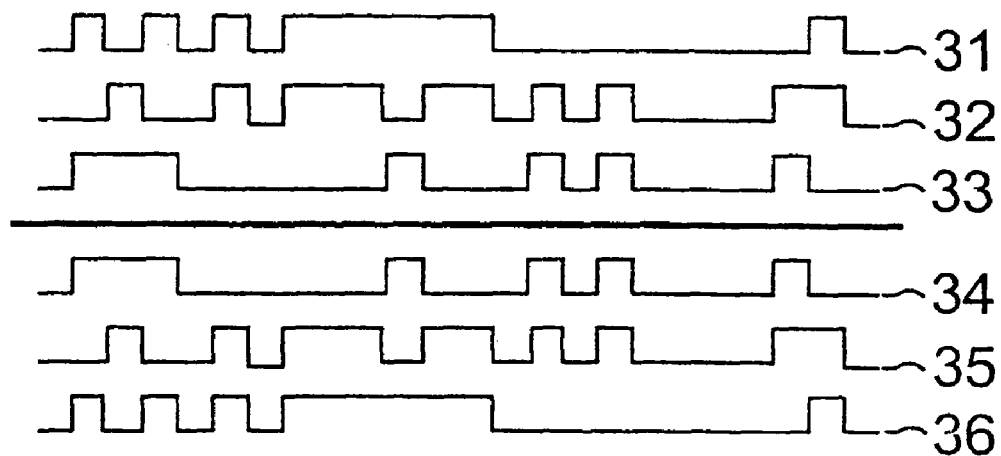
FIG. 3: is a time-dependency diagram of information data which are copied by means of pseudo random data.

FIG. 3 shows an example of an encoding or a decoding of data with the aid of a pseudo random signal. In this, the curve 31 shows the original data stream, as generated from the data transmitter. In the curve 32 a pseudo random sequence of the first pseudo random generator is shown. The curve 33 finally shows the output signal which is transmitted via the data path. Here this output signal arises, for example, from an exclusive OR-combination of the signals 31 and 32.

The input signal of the second movable unit 34 corresponds to the emitted signal 33. The original data signal 36 can be restored by means of a second pseudo random signal 35 from a second pseudo random generator. In this case too, an exclusive OR-combination is again made.

Figure 4:
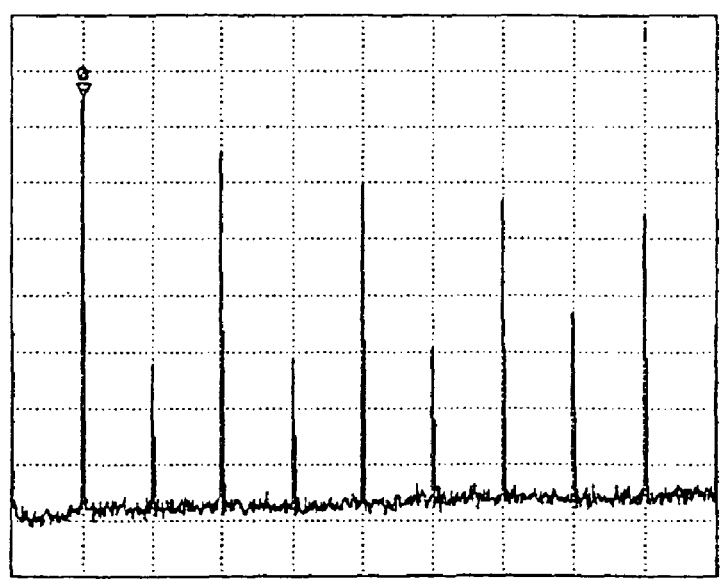
FIG. 4: is an output signal spectrum of a 200 Mbaud PCM transmission path.

FIG. 4 shows an example of a typical output signal spectrum of a 200 Mbaud PCM transmission path during a transmission of a 1 0 1 0 signal. The frequency range of 0-1 GHz is here plotted on the horizontal frequency axis having scale divisions of 100 MHz. In this example the maximum signal amplitude is −14.7 dBm.

The signal amplitude at the uppermost horizontal line (boundary of the diagram) is 0 dBm. The amplitude decreases by 10 dB per unit in downward direction.

Figure 5:
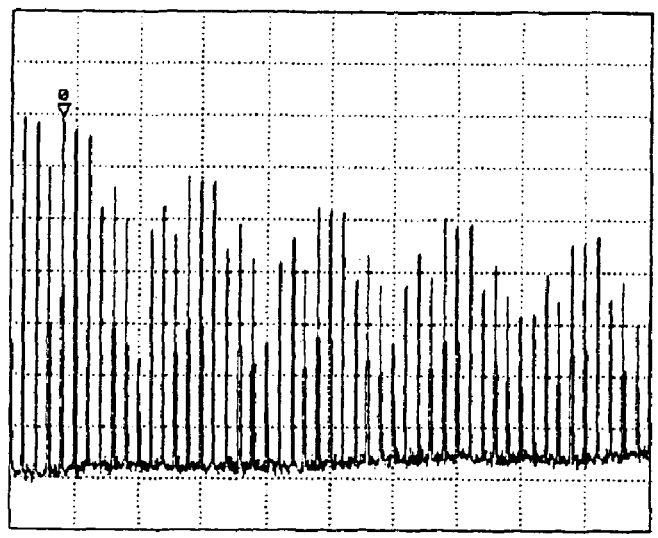
FIG. 5: is an output signal spectrum of an 8B/10B encoded signal.

FIG. 5 shows a typical output signal spectrum of a PCM signal which has been 8B/10B encoded, again in the frequency range of 0-1 GHz. As is distinctly evident here, when compared with the signal of FIG. 4, narrowband spectral components are present in a substantially larger number. Because of this division into a plurality of spectral lines, the amplitude of the single spectral lines is lowered. Thus, the maximum amplitude of this signal is now at a level of −20.6 dBm. This represents an improvement of nearly 6 dB over the signal of FIG. 4.

In this diagram the frequency range of 0-1 GHz is plotted on the horizontal frequency axis having scale divisions of 100 MHz. The signal amplitude at the uppermost horizontal line (boundary of the diagram) is 0 dBm. The amplitude decreases by 10 dB per unit in downward direction.

Figure 6:
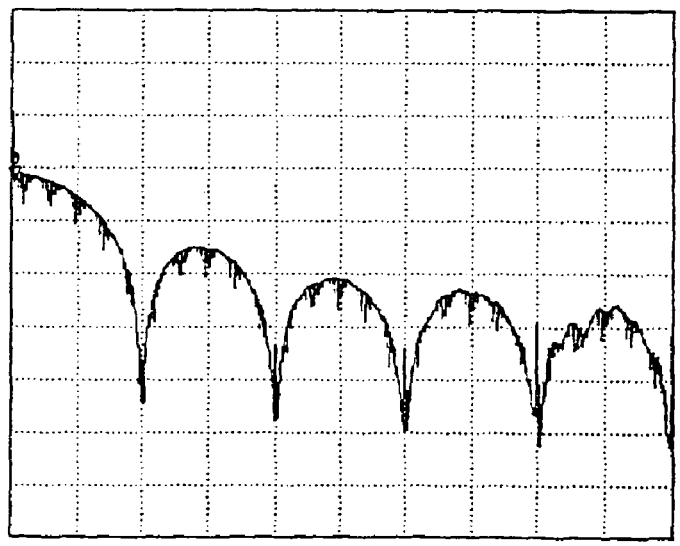
FIG. 6: is a spectrum of a signal encoded by means of a pseudo random number sequence.

FIG. 6 now shows an exemplification of the spectrum of a 2000 Mbaud PCM signal which has been encoded by means of a pseudo random-number sequence. Here too, the spectrum is again shown in the frequency region of 0-1 GHz. Now, because of the pseudo random number sequence, so many single spectral lines appear that they are no longer discernible as such in the illustration, and are run together to form an almost continuous cooling curve. Here the highest measured signal amplitude is at −32.5 dBm. This represents an improvement over the conventional 8B/10B encoded signal of about 12 dB, and an improvement over an uncoded signal, as illustrated in FIG. 4, of 18 dB.

In this diagram the frequency range of 0-1 GHz is plotted on the horizontal frequency axis having scale divisions of 100 MHz. The signal amplitude at the uppermost horizontal line (boundary of the diagram) is 0 dBm. The amplitude decreases by 10 dB per unit in downward direction.

The invention claimed is:

1. A data communication system, comprising:
   a first unit and a second unit, wherein the first unit is configured to transmit digital signals to the second unit, the first unit comprising:
      a data transmitter for emitting first digital signals within first time intervals;
      a pseudo random-generator or a random generator for generating pseudo random values or random values, respectively, a combining unit for combining the first digital signals with the pseudo random values or the random values at substantially the entirety in which the first digital signals are absent; and a control unit for controlling the combining unit in such a manner that pseudo random values or random values are transmitted at times other than the first time intervals;

and the second unit comprising:

a data receiver connected to the data transmitter by a transmission path.

2. The data communication system according to claim 1, wherein a signaling line is provided between the data transmitter and the data receiver, wherein the data transmitter signals the presence of first digital signals, pseudo random values, or random values to the data receiver.

3. The data communication system according to claim 1, wherein an additional transmission path for transmitting the pseudo random values or random values is provided, so that at the second unit a combination with the pseudo random values or random values takes place synchronously with a combining with the pseudo random values or random values at the first unit.

4. The data communication system according to claim 1, wherein the second unit comprises a second pseudo random-generator or random generator for generating pseudo random values or random values of a same sequence as the pseudo random generator of the first unit.

5. The data communication system according to claim 4, wherein an additional transmission path is provided for synchronizing the pseudo random generator or random generator of the first unit and the pseudo random generator or random generator of the second unit.

6. The data communication system according to claim 4, further comprising a unit for synchronizing the pseudo random generators or random generators of the first unit and the second unit.

7. The data communication system according to claim 6, wherein the unit for synchronizing the pseudo random generators or random generators of the first unit and the second unit is designed so that at a beginning of each signal transmission a synchronization sequence is used instead of pseudo random values or random values, which enables a synchronization of the pseudo random generators or random generators of the first unit and the second unit.

8. The data communication system according to claim 7, wherein for the synchronization sequence, the data transmitter is adapted to emit a predetermined or known bit pattern which is then combined with pseudo random values or random values of the pseudo random generator or random generator of the first unit by the combining unit connected on an output side of the pseudo random generator or random generator; and a control unit of the second unit is adapted to perform at various times a synchronization of the pseudo random generator or random generator of the second unit with received data from the first unit.

9. The data communication system according to claim 8, wherein for simplified synchronization between the data transmitter and the data receiver, a short pseudo random or random sequence is used at first, and after a given period of time, or after a synchronization with this pseudo random or random sequence, a switch-over is made to a longer pseudo random or random sequence.

* * * * *